Sept. 19, 1933.  G. SCHMELING  1,927,300
AUTOMOBILE JACK
Filed Feb. 16, 1931   3 Sheets-Sheet 1
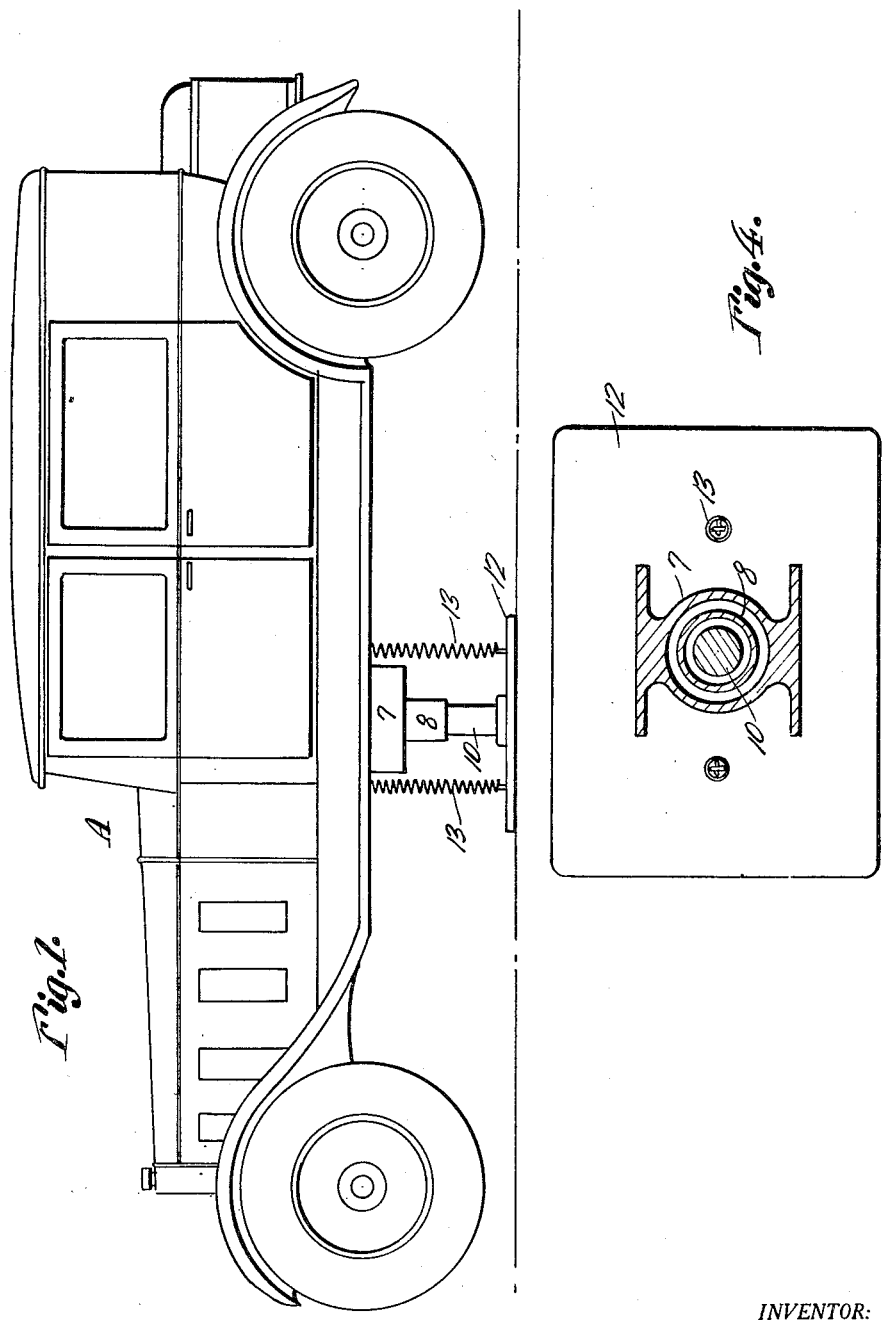
INVENTOR:
Gerhard Schmeling

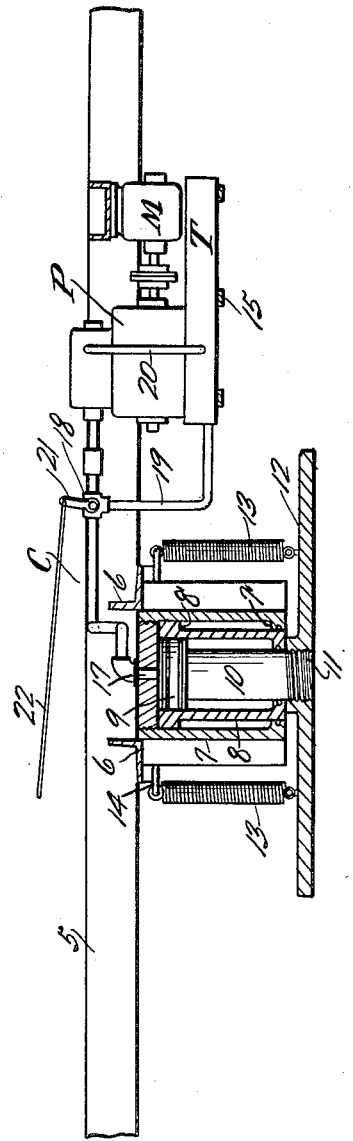
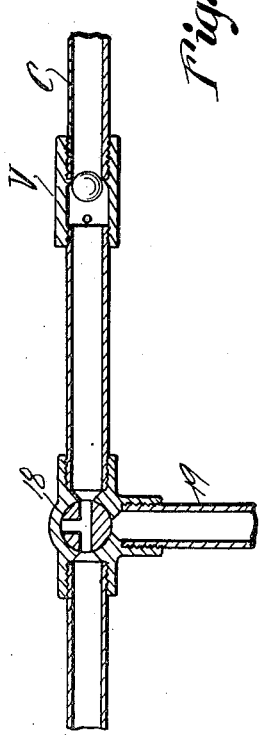

Sept. 19, 1933.　　　　G. SCHMELING　　　　1,927,300
AUTOMOBILE JACK
Filed Feb. 16, 1931　　　　3 Sheets-Sheet 3
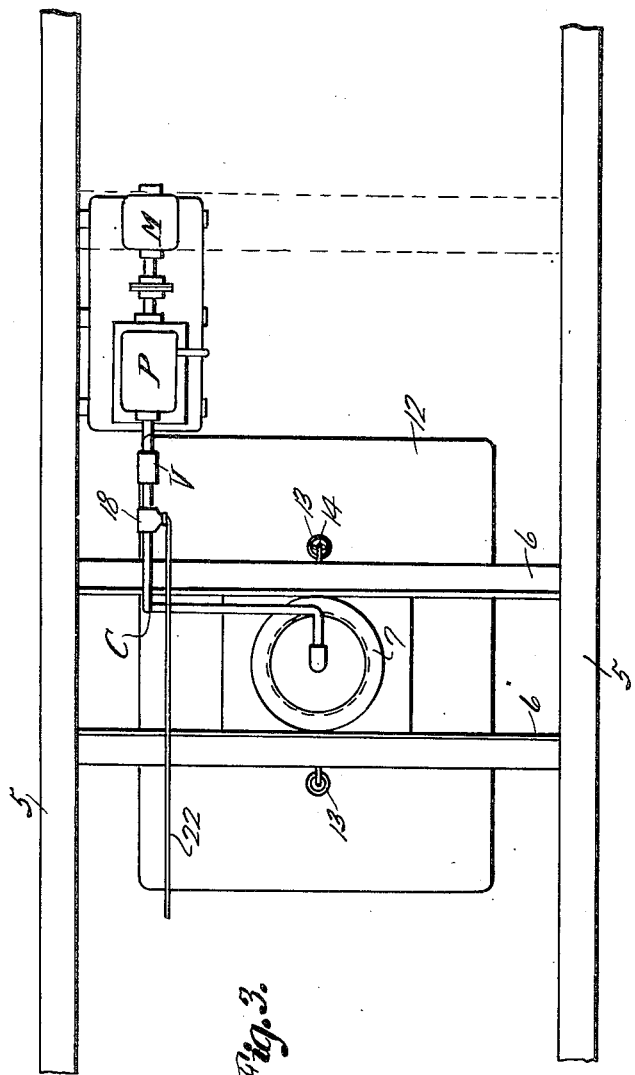
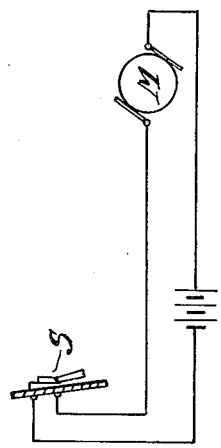
INVENTOR:
Gerhard Schmeling Patented Sept. 19, 1933

1,927,300

UNITED STATES PATENT OFFICE 1,927,300

AUTOMOBILE JACK

Gerhard Schmeling, Columbus, Wis.

Application February 16, 1931. Serial No. 516,229

1 Claim. (Cl. 254—86)

This invention relates to certain new and useful improvements in automobile jacks.

The primary object of the invention resides in the provision of a jack adapted to be carried beneath an automobile and having suitable means associated therewith for actuating the jack to raise the automobile above the ground.

A still further object of the invention is to provide a jack for vehicles, which is compact in form, consists of but comparatively few parts, exceedingly strong in structure, well adapted for raising a vehicle clear of the ground, to facilitate the making of repairs such as a change of tires and the like.

Other objects and advantages of the invention will become apparent during a study of the following description and in the accompanying drawings, wherein:

Figure 1 is a side elevational view of an automobile, having my improved jack associated therewith, the jack being shown in position for supporting the automobiles in an elevated position.

Figure 2 is a vertical transverse sectional view, taken through the jack, the telescopic parts of the jack being shown in telescoped or contracted relationship.

Figure 3 is a top plan view of the jack and a portion of the chassis of the automobile, with which the jack is associated.

Figure 4 is a transverse sectional view, taken through the jack.

Figure 5 is a diagrammatic view of the wiring system forming part of the invention.

Figure 6 is a fragmentary detail sectional view for more clearly illustrating the valve arrangement in the pressure line.

With reference more in detail to the drawings, the reference character A designates a conventional type of automobile, which includes among other parts the longitudinal chassis bars 5 and the chassis bars 6—6 extending in parallel spaced relation transversely between the chassis bars 5—5.

Supported by and depending from the spring members 6 is a fixed casing member 7 including the cylindrical body, in which is vertically slidable a cylinder 8, opened at its top or inner end.

At its open inner end the cylinder 8 is provided with an annular flange 8', adapted to engage with the flange 7' at the lower end of the casing 7, for limiting movement of the cylinder 8 in one direction relative to the casing 7.

Mounted for reciprocation within the cylinder 8 is a piston 9, that has a piston rod 10 extending through a suitable opening provided therefor in the bottom of the cylinder 8. Threaded, as at 11, to the lower free end of the piston rod 10 is a suitable platform for jack head 12 adapted to forcibly contact with the ground when the jack is operated for elevating the automobile A.

The parts 7, 8 and 10 are normally maintained in a contracted condition, that is, telescoped, one within the other, so that the platform 12 is normally retained out of ground engaging position through the medium of suitable coil springs 13, suitably anchored at their lower ends to the platform 12 and at their abutting ends having suitable connection 14 with the cross bars 6.

The means for operating the jack comprise a suitable air tank T mounted on a suitable cradle designated generally by the reference character 15 and suspended from one of the chassis bars 5, in a suitable manner. The tank T at one end thereof has a suitable pressure pump P. The pump P has suitable operating connection with an electric motor M. The motor M is arranged in a suitable circuit, which circuit also includes a manually operable switch S, adapted to be mounted on the dash board, or in any other position convenient to the operator of the vehicle.

From the outlet side of the pump P extends a conduit C, which leads to the casing 7, through the top of the casing as at 17. The conduit C comprises suitable pipe sections, suitably joined together. Arranged in the conduit is a suitable ball check valve V. Also arranged in the conduit is a suitable three-way valve 18, from one branch of which leads a return conduit 19 to the tank T. The tank T also has a suitable lead conduit 20 leading therefrom to the pump P.

To the crank 21 of the three way valve 18 is pivotally secured one end of an operating lever 22, which lever 22 extends into the body of the automobile to terminate within convenient reach of the operator of the automobile.

It is thought that the operation of the device will be apparent from a study of the foregoing description, taken in connection with the accompanying drawings.

Normally the parts are in the position shown in Figure 2, that is the platform or jack head 12 is raised or in a position out of engagement with the ground, whereby the automobile may travel without having its progress in any way impaired, through the medium of the jack structure carried therewith. To operate the jack for elevating the automobile above the ground, the operator first closes the switch S for closing the circuit to the electric motor M, for operating the pump P.

Air or similar fluid from the tank T is pumped through the conduit C, and by proper manipulation of the operating rod 22, the operator moves the three-way valve 18 from a closed position to the position suggested in Figure 6, to provide an uninterrupted passage through the conduit C to the casing 7. Fluid, under pressure, entering the casing 7 is directed upon the piston 9 and moves the latter downwardly of the cylinder 8 against the action of the springs 13, so that the jack head or platform 12 is forcibly brought into engagement with the ground. In this connection, it will be noted that as the piston 9 reaches the limit of its down stroke, pressure upon the piston will be such that the vehicle will raise to an elevated position, it being apparent that when the platform or jack head 12 is in ground engaging position the pressure will be such as to exert an upward push on the upper end of the casing 7, so that the casing 7 together with the entire automobile will move upwardly relative to the cylinder 8. When the automobile has been raised to the desired elevation, the rod 22 is suitably actuated for moving the valve 18 to a closed position.

When it is desired to lower the automobile, it will be apparent that the operator need only suitably manipulate the rod 22, so that one branch of the three way valve 18 will be brought into registry with the return conduit 19, at the same time suitably operating the switch S, for completing the circuit to the motor M. Thus, under the weight of the vehicle, the fluid in the cylinder 8 and casing 7 will be forced upwardly through the conduit C and return branch 19 to return to the tank T, thus releasing pressure on the piston 9, so that the latter will move upwardly of the cylinder 8, under the action of the springs 13. Of course, as the piston 9 moves upwardly of the cylinder, so that the platform 12 contacts with the lower end of the cylinder 8, the latter will, of course, be drawn upwardly into the casing 7, so that the parts will again assume that position shown in Figure 2.

Even though I have herein shown and described the preferred embodiment of my invention, it is to be understood that the same is susceptible to changes fully comprehended by the spirit of the invention as herein described, and the scope of the appended claim.

What is claimed is:

An automobile, having in combination a casing, supporting means for the casing beneath the automobile, a cylinder vertically movable within said casing, a piston mounted for reciprocation in said cylinder, and including a piston rod extending through the lower end of said cylinder, a supporting platform carried by the free end of said piston rod, spring means for normally urging said piston in one direction in said cylinder, and for retaining said cylinder yieldably in said casing, and fluid pressure means for actuating the piston against the action of said spring means for moving said supporting platform into ground engaging position for elevating the automobile.

GERHARD SCHMELING.